March 29, 1966 A. E. T. NEALE ET AL 3,242,973
HEAT EXCHANGE APPARATUS
Filed May 13, 1964
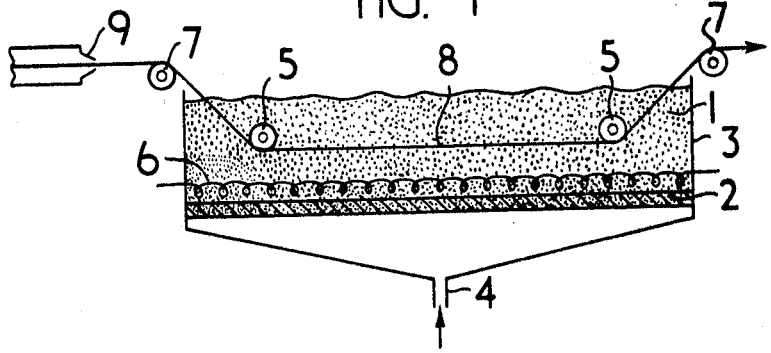
FIG. 1
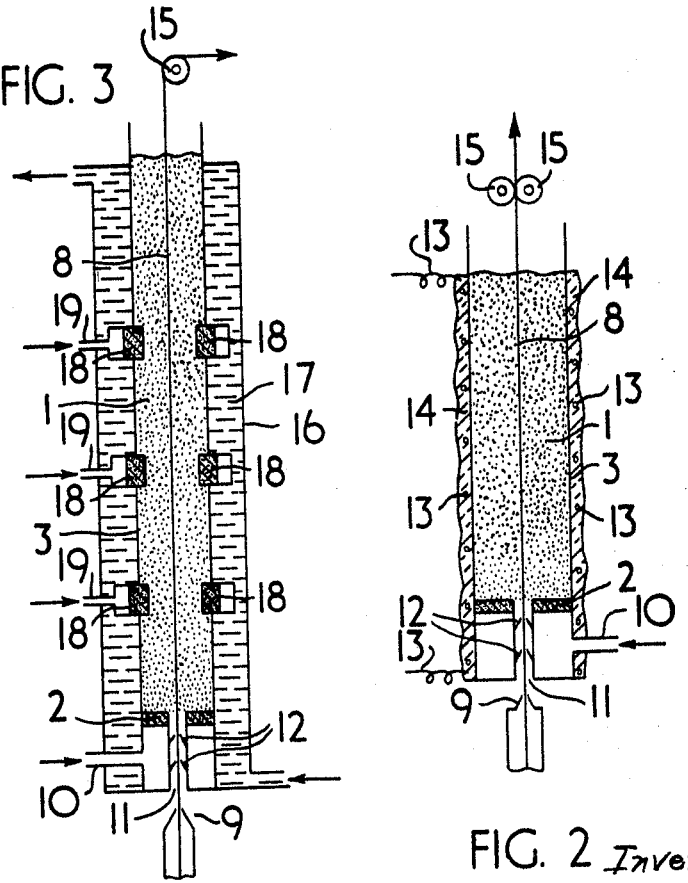
FIG. 3
FIG. 2
Inventors
Albert E.T. Neale
William A Gurney
By Stevens, Davis, Miller & Mosher
Attorneys

United States Patent Office

3,242,973
Patented Mar. 29, 1966

3,242,973
HEAT EXCHANGE APPARATUS
Albert Edward Toney Neale, Sutton Coldfield, and William Arthur Gurney, Castle Bromwich, England, assignors to Dunlop Rubber Company Limited, London, England, a British company
Filed May 13, 1964, Ser. No. 367,255
Claims priority, application Great Britain, May 24, 1963, 20,732/63
16 Claims. (Cl. 165—1)

This invention relates to heat-exchange apparatus and to such apparatus employing a fluidized solid as the heat-exchange means, and is an improvement in or modification of the invention described and claimed in our co-pending application Serial No. 232,908, now abandoned.

In our co-pending application No. 38,657/61, we have described and claimed a heat-exchange apparatus comprising a bed of particles of common salt in a container and the means for passing a gas or vapour through said bed to maintain said particles of common salt in fluid suspension.

According to the present invention, a heat-exchange apparatus comprises a heat-exchange vessel provided with a heat-exchange medium comprising a layer of particles of a solid pyrophosphate of a metal that can be maintained in fluid suspension by continuous agitation of the particles by a gas or vapour, and means for distributing a gas or vapour through the layer to maintain said particles in fluid suspension.

According to the present invention also, a method of transferring heat to or from an article comprises establishing a bed of particles of a solid pyrophosphate of a metal, passing a gas or vapour through the bed of particles to maintain the particles in fluid suspension, heating or cooling the particles to the desired temperature and passing the article through the bed of particles maintained in fluid suspension.

Generally, the heat-exchange vessel comprises a horizontal trough or vertical column provided with means for distributing the gas or vapour through the layer of particles of the solid pyrophosphate. When the vessel is in the form of a horizontal trough, then a convenient distributing means is a porous tile, for example, a tile manufactured from ceramic material or sintered stainless steel, which serves the dual purpose of acting as a support for the layer of particles of solid pyrophosphate, and of dividing up the gas or vapour passing through the tile into the layer. Other means for distributing the gas or vapour to maintain the particles in fluid suspension are packed beds or grids, or porous metal plates or porous glass plate. An alternative means for distributing the gas or vapour can be one or more cylinders of porous material that are embedded in the layers of particles of pyrophosphate and the use of such cylinders enables replacements and repairs to the distributing means to be effected quickly without any unnecessary loss of operating time. When a vertical column is used to provide the heat-exchange vessel, then this can be formed from one, two or more sections having a cylindrical shape. The sections can be spaced apart by rings of porous material through which the gas or vapour is passed into the interior of the column. A porous plate can be positioned at the base of the column if desired.

When the gas or vapour is passed upwardly through the layer of particles of the solid pyrophosphate, then the particles behave as a fluid and heavy articles which would normally remain on the surface of the layer when it is at rest, sink rapidly when it is fluidized. This enables articles such as organic thermoplastic fibres, vulcanizable rubber compositions, and other articles to or from which heat is to be transferred, to be passed easily through the layer. The layer of particles of solid pyrophosphate can be fluidized by passing air or an inert gas, for example nitrogen, through the layer. Reactive gases can be employed if desired, a typical example being sulphur dioxide which can be employed as a fluidizing medium and to effect vulcanization of suitable rubber compositions.

The heat-exchange apparatus can be employed to heat articles that are immersed or passed through the bed, or alternatively, the apparatus can be employed to cool articles. When the apparatus is to be employed as a heating means, then it is usual to heat the layer of particles by some means. This can be achieved by heating the gas or vapour that is used to fluidize the layer, or alternatively or in addition, heating coils can be positioned within the layer, or the heat-exchange vessel can itself be provided with a jacket through which a hot liquid is passed. Preferably, the layer of particles of solid pyrophosphate is heated by means of electrical heating elements which are immersed in the layer or arranged around the heat-exchange vessel. When the apparatus is to be employed as a cooling means, then coils through which a cold liquid is passed can be immersed in the layer, or the gas or vapour used to fluidize the layer can be cooled prior to use, or a cold liquid can be passed through a jacket attached to the heat-exchange vessel.

Examples of suitable pyrophosphates which can be used to form the layer to be fluidized are sodium pyrophosphate, potassium pyrophosphate, aluminum pyrophosphate, calcium pyrophosphate and iron pyrophosphate, and it has been found that these substances have a high melting point that is in excess of 1000° C. which enables them to be used in a heat-exchange apparatus at higher temperatures than has hitherto been possible. The pyrophosphates are non-corrosive with ferrous metals and the crystals are sufficiently hard for them not to disintegrate or become reduced in size to any appreciable extent during their use in the heat-exchange apparatus. Further, the pyrophosphates have the additional advantage that they offer no physiological hazard owing to dissemination into the atmosphere when used.

The crystalline pyrophosphates can be obtained in several gradings which contain various ranges of particle size, and those with a very wide distribution of particle size can only be used satisfactorily when the very fine particles are removed. Preferably, the most satisfactory particle size for use in the heat-exchange apparatus is from 0.25 mm. to 1 mm. Granular sodium pyrophosphate having approximately this range of particle size and an almost complete absence of fine particles, is commercially obtainable and is most suitable for use in the heat-exchange apparatus. An additional advantage of these pyrophosphates is their low cost as compared with ballotini (glass spheres) which is commonly used as the heat-exchange medium in fluid beds.

The heat-exchange apparatus can be used, amongst others, for such purposes as the removal of water or moisture from an article by heating the article, and in this case, it is preferable to employ as the particles of solid pyrophosphates, a pyrophosphate that is insoluble in water, such as aluminum pyrophosphate or iron pyrophosphate. The soluble pyrophosphates such as sodium pyrophosphate can be used with advantage when the heat-exchange apparatus is employed to effect the vulcanization or partial vulcanization of a vulcanizable rubber composition, and in this case, any particles of pyrophosphate which become attached to the rubber composition during vulcanization can be removed from the surface of the rubber at the end of the treatment by washing with cold water.

The heat-exchange apparatus containing a layer of particles of a solid pyrophosphate maintained in fluid suspension is particularly useful for the vulcanization of rubber compositions by a continuous vulcanization technique, in which the rubber composition is extruded into the layer of particles in fluid suspension and passed through the layer for a time sufficient to effect the vulcanization. The heat-exchange apparatus can be used, if desired, in conjunction with an oven into which the rubber composition, which has been heated quickly to the vulcanization temperature in the layer of particles in fluid suspension, is passed and is maintained at this temperature for the desired vulcanization time.

Three forms of heat-exchange apparatus constructed in accordance with the invention will now be described by way of example only with reference to the accompanying drawings in which:

FIGURE 1 represents a longitudinal cross-section of a heat-exchange apparatus,

FIGURE 2 represents a vertical cross-section of a heat-exchange apparatus,

FIGURE 3 represents a vertical cross-section of a heat-exchange apparatus having an alternative construction to that shown in FIGURE 2.

The methods of heat-exchange described below refer to the heating of a composition in the form of a sheet or tube, for example, the vulcanization of an extruded rubber composition.

As shown in FIGURE 1, the apparatus comprises a layer of solid metal pyrophosphate particles 1 supported on a porous tile 2 which extends horizontally across a container 3 in the form of a horizontal open trough. The container 3 is also provided with an inlet 4 at its base, guide-rollers 5 positioned in the layer 1, and one or more electrical heating elements 6 situated in the layer 1 between the porous tile 2 and the guide-rollers 5. Further guide-rollers 7 are situated at each end of the container 3 near the top thereof. The composition to be heated 8 is extruded through the extruded head 9 and is guided through the layer 1 by the guide-rollers 7 and 5. During this operation, the layer 1 is heated to and maintained at the desired temperature by the heating elements 6, and at the same time the particles of the layer 1 are maintained in a fluidized state by a gase or vapour which enters the apparatus through the inlet 4 and passes through the porous tile 2. The speed of the composition 8 passing through the layer 1 is varied according to the temperature of the layer 1 and the thickness of the composition 8.

As shown in FIGURE 2 a further form of apparatus comprises a layer of solid metal pyrophosphate particles 1 supported on a porous tile 2 which extends horizontally across a vertical container 3 near the base thereof. The base of the container 3 is provided with an inlet 10 positioned beneath the porous tile 2, and an inlet 11 which extends through the centre of the tile 2 at the base of the container 3 and which is provided with one-way valves 12 which prevent the loss of particles 1 through the inlet 11. The apparatus further comprises electrical heating wire 13 wound in helical fashion within an insulating jacket 14 around the exterior surface of the container 3, and drawing-rollers 15 situated at the top end of the container 3. The composition 8 is passed upwards from an extruder head 9 through the layer 1 via the valves 12, and is drawn from the layer 1 by the drawing-rollers 15. During the operation, the layer 1 is heated by the wire 13 and is maintained in a fluidized condition by a gas or vapour which enters through the inlet 10 and passes through the porous tile 2.

As shown in FIGURE 3 an alternative form of apparatus comprises the features of the apparatus described with reference to FIGURE 2 above, except that the heating means is a jacket 16 through which a hot liquid 17 is passed, and the container 3 is split into four sections by three porous annular rings 18 provided with inlets 19. The mode of operation is also similar to that described for that of the apparatus of FIGURE 2, with the modification that the fluidization of the layer of particles 1 is further aided by a gas or vapour which enters via the inlets 19 and passes through the porous rings 18.

The invention is illustrated in the following examples:

*Example I*

A hard glass tube of 30 mm. internal diameter and 40 cm. in length had a circular sintered-glass disc, No. 1 grade and 30 mm. diameter, sealed into it at about 8 cm. from one end. The tube was clamped in a vertical position with the part carrying the sintered disc below and the main length of tube uppermost. The lower end of the tube was closed with a bung carrying an 8 mm. delivery tube connected to a source of compressed air. The part of the tube above and immediately below the sintered disc was heated by an electrical tape wound in helix form round the tube leaving a helical gap for observation purposes.

The tube above the sintered disc was filled to a depth of about 5 cm. with granular sodium pyrophosphate and a stream of compressed air was passed upwards through the sintered disc into the pyrophosphate. The tube was then heated and the heating and the flow of the compressed air were adjusted until the pyrophosphate was seen to fluidize. This was judged by the appearance of the powder which seemed to be moving as a fluid and in a condition of apparent "boiling." Before fluidization the powder supported a glass rod pushed into it to a depth of 2 cm. and on fluidization the rod became unsupported and sank to the level of the sintered disc.

Fluidization will occur in the cold if sufficient air is passed but for the purposes of heat-exchange the temperature can be raised to 200° C. or more. With the granular sodium pyrophosphate used in this example, it was possible to demonstrate fluidization at a temperature of 400° C. The temperature was measured by immersing a thermometer in the hot fluid.

The apparatus described above can be used to test whether any particular pyrophosphate of a metal is suitable for use in a heat-exchange apparatus according to the invention, since it is clear, on inspection of the apparatus, whether the pyrophosphate is satisfactorily fluidized. Should the pyrophosphate, when heated, tend to aggregate together and show no sign of mixing with the air, then this is immediately apparent. This test is extremely easy to carry out and allows a suitable selection of the pyrophosphate to be made prior to use in factory production installations.

*Example II*

A rubber composition was prepared from the following ingredients, all parts being parts by weight.

| | |
|---|---|
| Natural rubber | 70.0 |
| Styprene-butadiene rubber | 30.0 |
| Sulphur | 3.25 |
| Accelerator | 1.4 |
| Retarder | 0.5 |
| Antioxidant | 2.3 |
| Softeners | 6.0 |
| Stearic acid | 1.0 |
| Zinc oxide | 5.0 |
| Carbon black (general purpose furnace) | 30.0 |
| Clay | 7.0 |
| Quick lime | 5.0 |

The composition was extruded in the form of a hollow tube of ⅜ inch external diameter and 1/16 inch wall thickness, and was passed immediately into a bed of fluidized sodium pyrophosphate maintained at 200° C. The tube was immersed in the bed for 50 seconds and emerged fully vulcanized.

Having now described our invention, what we claim is:

1. A method of vulcanizing a rubber composition by heat treatment comprising establishing a bed of particles of a solid pyrophosphate of a metal, passing a fluidizing medium selected from the group consisting of a gas and a vapor through the bed of particles to maintain the particles in fluid suspension, maintaining the particles at the desired temperature and passing the rubber composition through the bed of particles maintained in fluid suspension.

2. A method according to claim 1 wherein the solid pyrophosphate of a metal is soluble in water.

3. A method according to claim 1 wherein the solid pyrophosphate of a metal is insoluble in water.

4. A method according to claim 1 in which the gas is air.

5. A method according to claim 1 in which the gas is an inert gas.

6. A method according to claim 5 in which the inert gas is nitrogen.

7. A method according to claim 1 in which the solid pyrophosphate of a metal has a particle size of from 0.25 mm. to 1 mm.

8. A method according to claim 1 wherein the fluidizing medium is gaseous sulfur dioxide.

9. A method for the removal of moisture from an article which comprises eseablishing a bed of particles of a solid pyrophosphate of a metal which is insoluble in water, passing a fluidizing medium selected from the group consisting of a gas and a vapor through the bed of particles to maintain the particles in fluid suspension, heating the particles to an elevated temperature and immersing the article in the bed of particles until the moisture is removed.

10. A rubber vulcanizing heat exchange apparatus comprising a heat exchange vessel, a heat exchange medium contained in said vessel, said heat exchange medium comprising a layer of particles of a solid pyrophosphate of a metal, means to maintain said particles in fluid suspension by continuous agitation, said means being a fluidizing medium selected from the group consisting of a gas and a vapor, means for distributing said fluidizing medium through the layer of particles to maintain said particles in fluid suspension, means for changing the temperature of the particles and means for passing a vulcanizable rubber composition through the layer of particles maintained in fluid suspension.

11. A heat exchange apparatus according to claim 10 in which the solid pyrophosphate of a metal has a particle size of from 0.25 mm. to 1 mm.

12. A heat exchange apparatus according to claim 10 in which the heat exchange vessel is a horizontal trough.

13. A heat exchange apparatus according to claim 10 in which the heat exchange vessel is a vertical column.

14. A heat exchange apparatus according to claim 12 in which the means for distributing the fluidizing medium is a porous tile which extnds across the trough and which in addition provides a support for the layer of particles of a solid pyrophosphate of a metal.

15. A heat exchange apparatus according to claim 12 in which the means for distributing the fluidizing medium is a cylinder of porous material which is embedded in a layer of particles of a solid pyrophosphate of a metal.

16. A heat exchange apparatus according to claim 13 in which the vertical column is formed from at least two cylindrical sections, each section being separated from the adjacent section by a ring of porous material which is used to distribute the fluidizing medium through the layer of particles of a solid pyrophosphate of a metal.

References Cited by the Examiner

UNITED STATES PATENTS

| 3,042,480 | 7/1962 | Chipalkatti et al. | 34—9X |
| 3,053,704 | 9/1962 | Munday | 263—40 |

FOREIGN PATENTS

| 699,151 | 10/1953 | Great Britain. |
| 864,117 | 3/1961 | Great Britain. |

ROBERT A. O'LEARY, *Primary Examiner.*

M. A. ANTONAKAS, *Assistant Examiner.*